United States Patent
Butter et al.

(10) Patent No.: US 10,025,298 B2
(45) Date of Patent: Jul. 17, 2018

(54) USER INTERFACE AND METHOD FOR ELIMINATING FAULTS IN AN INDUSTRIAL INSTALLATION

(71) Applicant: SIEMENS AKTIENGESELLSCHAFT, München (DE)

(72) Inventors: Christian Butter, München (DE); Alexander Politiadis-Behrens, Höchstadt A.D.Aisch (DE); Eckhard Seibert, Hagenbach (DE); Silvio Wolf, Haar (DE)

(73) Assignee: SIEMENS AKTIEGESELLSCHAFT (DE)

( * ) Notice: Subject to any disclaimer, the term of this patent is extended or adjusted under 35 U.S.C. 154(b) by 210 days.

(21) Appl. No.: 14/437,217

(22) PCT Filed: Oct. 22, 2013

(86) PCT No.: PCT/EP2013/072042
§ 371 (c)(1),
(2) Date: Apr. 21, 2015

(87) PCT Pub. No.: WO2014/075876
PCT Pub. Date: May 22, 2014

(65) Prior Publication Data
US 2015/0268662 A1  Sep. 24, 2015

(30) Foreign Application Priority Data
Nov. 13, 2012 (DE) .................. 10 2012 220 639

(51) Int. Cl.
*G06F 3/0482* (2013.01)
*G05B 19/418* (2006.01)
(Continued)

(52) U.S. Cl.
CPC ..... *G05B 19/4184* (2013.01); *G05B 23/0272* (2013.01); *G06F 3/0482* (2013.01);
(Continued)

(58) Field of Classification Search
CPC ..................................................... G06F 3/0482
(Continued)

(56) References Cited

U.S. PATENT DOCUMENTS 4,247,846 A * 1/1981 Zedler .............. G08B 27/00
340/523
5,267,277 A * 11/1993 Scarola ............... G05B 9/03
376/216
(Continued)

FOREIGN PATENT DOCUMENTS

CN       1838011 A       9/2006
CN       1845029 A       10/2006
(Continued)

OTHER PUBLICATIONS

International Search Report; PCT/EP2013/072042; International File Date: Oct. 22, 2013; 2 pgs.
(Continued)

*Primary Examiner* — Reza Nabi
*Assistant Examiner* — Daniel Rodriguez
(74) *Attorney, Agent, or Firm* — Schmeiser Olsen & Watts LLP

(57) ABSTRACT

Technical installation data are visually preprocessed in a targeted manner in a control room or on a tablet with a touchscreen in mobile use by presenting a priority matrix. For this purpose, the interference messages are sorted, for example, horizontally with descending priority from left to right and vertically according to the installation part and are output. This largely relieves an operator of analysis and prioritization of the interference messages. The operator can (Continued)

Figure 1:
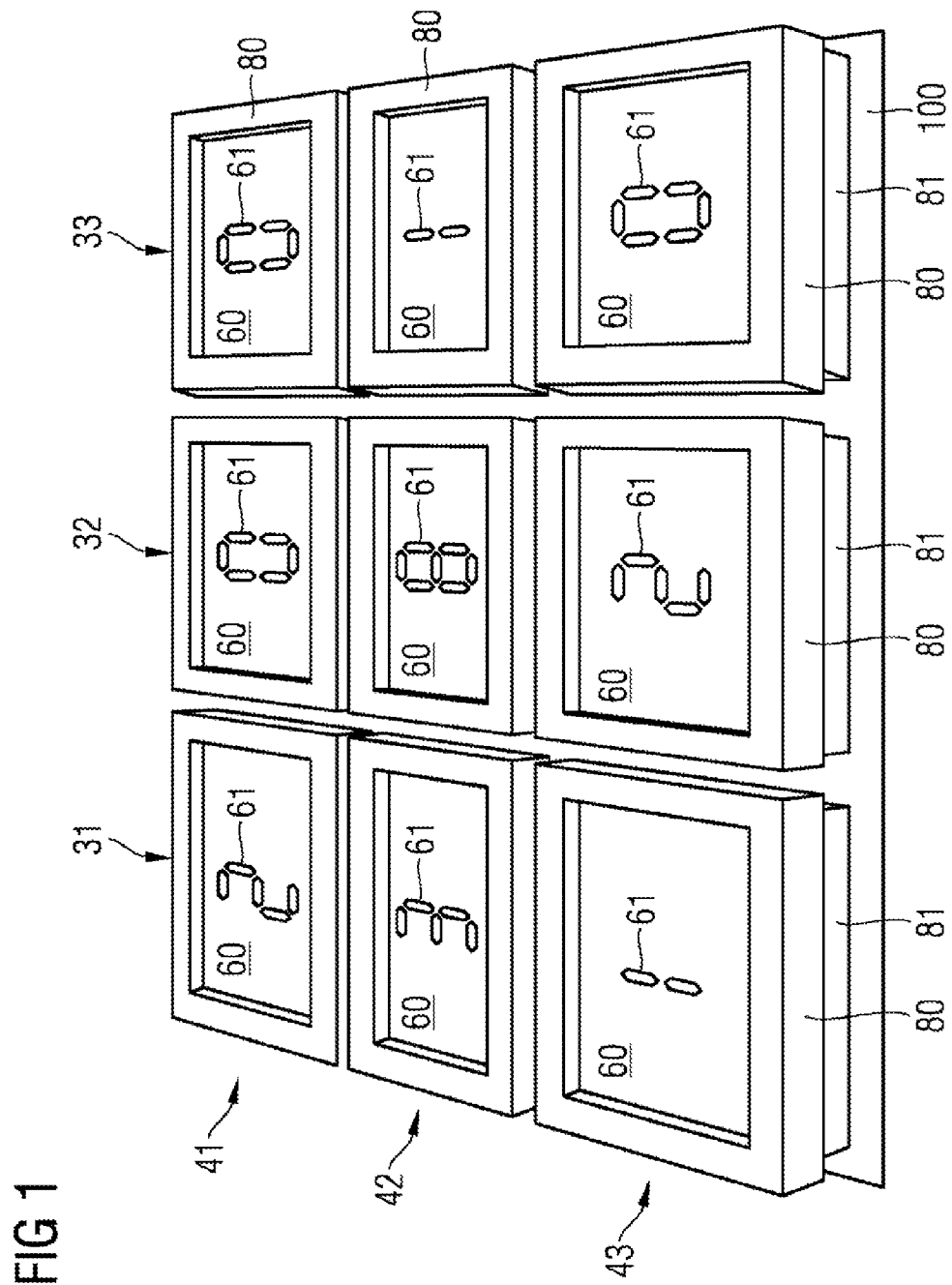

therefore identify, locate and eliminate the most important interference messages in a shorter time. The number of priorities and installation parts considered is flexible since the matrix can be scaled to a wide variety of installation types, installation sizes and processes. All technical installation data relevant to assessing the situation are combined in one view. A second display area with a logical view is used to provide an overview of the complete industrial installation.

12 Claims, 2 Drawing Sheets

(51) Int. Cl.
  *G05B 23/02* (2006.01)
  *G06F 3/0488* (2013.01)
(52) U.S. Cl.
  CPC .. *G06F 3/0488* (2013.01); *G05B 2219/13031* (2013.01); *G05B 2219/23377* (2013.01)
(58) Field of Classification Search
  USPC .......................................................... 715/781
  See application file for complete search history.

(56) References Cited

U.S. PATENT DOCUMENTS

| | | | |
|---|---|---|---|
| 5,353,315 A | 10/1994 | Harmon | |
| 6,492,901 B1* | 12/2002 | Ridolfo | G21C 17/00 340/506 |
| 7,137,074 B1* | 11/2006 | Newton | G06F 11/0748 715/835 |
| 7,603,458 B1* | 10/2009 | Sexton | H04L 41/065 709/224 |
| 8,269,620 B2* | 9/2012 | Bullemer | G05B 23/0272 340/506 |
| 8,310,449 B1* | 11/2012 | Butikofer | G06F 3/04895 345/168 |
| 8,738,972 B1* | 5/2014 | Bakman | G06F 11/0712 714/47.1 |
| 2002/0055790 A1* | 5/2002 | Havekost | G05B 23/027 700/80 |
| 2002/0071247 A1* | 6/2002 | Clark | G06F 3/1446 361/679.21 |
| 2003/0073541 A1* | 4/2003 | Carlson | A63B 69/0053 482/1 |
| 2004/0090427 A1* | 5/2004 | Blair | G06F 1/1607 345/173 |
| 2006/0289459 A1* | 12/2006 | Schmidt | A47J 27/62 219/497 |
| 2007/0211079 A1* | 9/2007 | Nixon | G06F 9/4488 345/619 |
| 2009/0183025 A1* | 7/2009 | Palazzolo | G06F 11/0727 714/5.1 |
| 2010/0010647 A1 | 1/2010 | Cozmi | |
| 2010/0102136 A1 | 4/2010 | Powell | |
| 2010/0277307 A1* | 11/2010 | Horton | G06Q 10/06 340/539.11 |
| 2011/0144777 A1* | 6/2011 | Firkins | G05B 23/027 700/80 |
| 2013/0104064 A1* | 4/2013 | McCormick | G06F 3/0484 715/765 |
| 2013/0254667 A1* | 9/2013 | Ganesh | G06F 3/0484 715/736 |
| 2014/0057626 A1* | 2/2014 | Uelk | H04W 24/00 455/423 |

FOREIGN PATENT DOCUMENTS

| | | |
|---|---|---|
| DE | 10217107 A1 | 11/2002 |
| DE | 102010061132 A1 | 6/2011 |
| GB | 2275814 A | 9/1994 |
| JP | H11184589 A | 7/1999 |
| JP | 101145056 A | 3/2008 |

OTHER PUBLICATIONS

Chinese Office Action dated Jun. 12, 2016; Application No. 201380059297.2; 22 Pgs.
Australian Patent Examination Report No. 1 dated Aug. 26, 2015; Application No. 2013347176; 3 pgs.

* cited by examiner

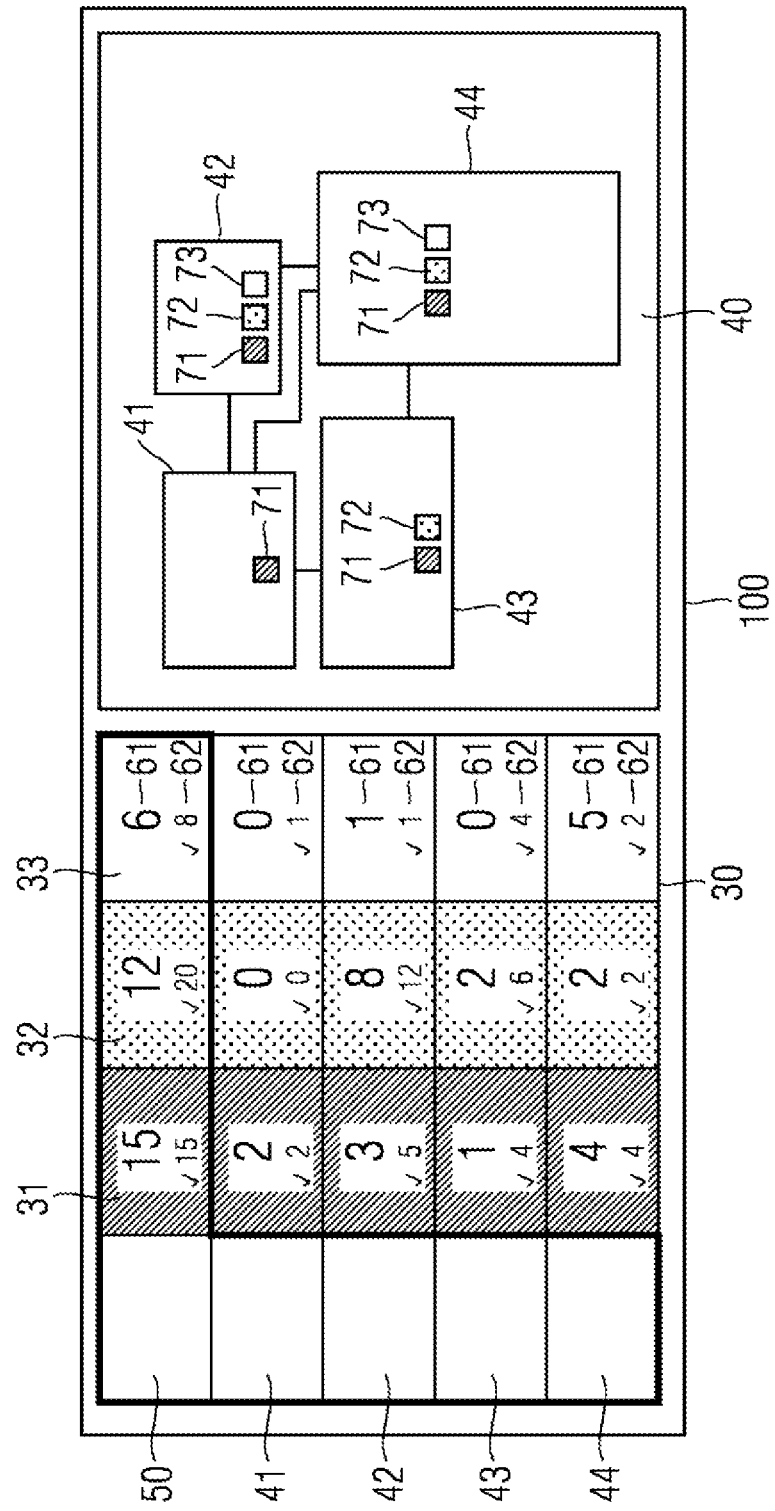

USER INTERFACE AND METHOD FOR ELIMINATING FAULTS IN AN INDUSTRIAL INSTALLATION

CROSS-REFERENCE TO RELATED APPLICATIONS

This application claims priority to PCT Application No. PCT/EP2013/072042, having a filing date of Oct. 22, 2013, based on DE 102012220639.6 having a filing date of Nov. 13, 2012, the entire contents of which are hereby incorporated by reference.

FIELD OF TECHNOLOGY

The following relates to specifying a user interface and a method for eliminating faults in an industrial installation, which can be used to quickly identify and eliminate the most important fault messages.

BACKGROUND

In modern control rooms of industrial installations, highly complex volumes of technical data are visualized and evaluated by operating personnel: for example a structure of the industrial installation and the number, priorities and acknowledgement states of fault messages. These volumes of data are displayed separately from one another according to their respective information sources. For example, alarm lists, operating images and the installation structure are visualized in display regions which are separate from one another.

SUMMARY

An aspect relates to a user interface having a data interface set up to receive fault messages which have each been assigned a priority from a plurality of priorities and an installation part from a plurality of installation parts of an industrial installation. The user interface also comprises touch-sensitive display areas which are arranged in a two-dimensional matrix, the priorities having been sorted in a first dimension of the matrix and the installation parts having been sorted in a second dimension of the matrix. A second display region is arranged beside the display areas and is set up to output a logical view, in particular a block or tree diagram, of the industrial installation. The user interface also comprises a computing unit which is programmed to display the fault messages in the corresponding display areas according to their priority and installation part, to subdivide the logical view into the installation parts, to display the fault messages in or beside the respective installation parts in the logical view, and to detect when one of the display areas is touched, to select the respective priority, the respective installation part and the associated fault messages and to initiate user guidance in order to control the selected installation part for the purpose of processing the selected fault messages.

In the method for eliminating faults in an industrial installation, a data interface is used to receive fault messages which are or have each been assigned a priority from a plurality of priorities and an installation part from a plurality of installation parts of an industrial installation. Touch-sensitive display areas are arranged in a two-dimensional matrix, the priorities being sorted in a first dimension of the matrix and the installation parts being sorted in a second dimension of the matrix. A second display region beside the display areas displays a logical view, in particular a block or tree diagram, of the industrial installation. A computing unit displays fault messages in the corresponding display areas according to their priority and installation part, subdivides the logical view into the installation parts, displays the fault messages in or beside the respective installation parts in the logical view, detects when one of the display areas is touched, then selects the respective priority, the respective installation part and the associated fault messages and initiates user guidance in order to control the selected installation part for the purpose of processing the selected fault messages.

The advantages mentioned below need not necessarily be achieved by the subject matters of the independent patent claims. Rather, these may also be advantages which are achieved only by means of individual embodiments, variants or developments.

The second display region provides an overview of the complete industrial installation. The combined display with the matrix makes it possible to identify individual error sources in a large volume of information. Linking the display of the fault messages in the logical view with the display of the fault messages in the matrix facilitates the analysis for an operator. Overview and detailed information is advantageously merged in a combined display, as a result of which the operator can analyze and process the fault messages more efficiently and can easily and quickly assess the state of the industrial installation.

The user interface and the method provide a priority matrix which visually preprocesses the technical installation data in a targeted manner. For this purpose, the fault messages are sorted horizontally with decreasing priority from left to right and are sorted vertically according to the installation part, for example, and are output.

The output of the fault messages which is sorted according to priorities and installation parts in the matrix largely relieves an operator of the analysis and prioritization of the fault messages. The operator can therefore quickly identify and eliminate the most important fault messages.

The number of priorities and installation parts considered is flexible since the matrix can be scaled in any desired manner by accordingly designing the user interface. The user interface can therefore be scaled and adapted for a wide variety of installation types, installation sizes and processes.

All of the technical installation data relevant to assessing the situation are merged in a screen view. The assessment of important and less important fault messages and their location is facilitated.

According to one embodiment, each display area consists of a digital display or a touchscreen. A touch-sensitive contact or switch is actuated by touching or pressing on the display area.

In one development, all display areas are arranged on a single touchscreen, in particular a touch-sensitive tablet.

In one development, the user interface is part of a control room and the industrial installation is a power plant. Alternatively, the user interface is a touch-sensitive tablet and the industrial installation is a wind power plant.

According to one embodiment of the method, the computing unit displays both a number of open fault messages and a number of acknowledged fault messages in the display areas. Therefore, both information relating to the number of respective fault messages and information relating to the acknowledgement states of the respective fault messages is displayed in each display area of the priority matrix.

In one development, the computing unit displays, at the edge of the matrix, a table header which indicates a legend for the priorities and installation parts and indicates a sum of the number of open fault messages over all installation parts for each priority.

The computer-readable data storage medium stores a computer program which carries out the method when it is executed in a computer. The computer program is executed in a computer and in the process carries out the method.

BRIEF DESCRIPTION

Some of the embodiments will be described in detail, with reference to the following figures, wherein like designations denote like members, wherein:

FIG. 1 shows an embodiment of a user interface having switches which are arranged in a matrix and each comprise a digital display; and FIG. 2 shows an embodiment of a user interface which displays fault messages both in a matrix and in a logical view of an industrial installation.

DETAILED DESCRIPTION

FIG. 1 shows a user interface 100 comprising nine switches 80 which are arranged in a matrix. Each switch 80 consists of a base 81 and a digital display 60 on which a number of open fault messages 61 is output. In this case, the switches 80 in the top row relate to a first installation part 41, the switches 80 in the middle row relate to a second installation part 42 and the switches 80 in a bottom row relate to a third installation part 43. In addition, the switches 80 in the left-hand column indicate the number of open fault messages 61 with a high priority 31, the switches 80 in the middle column indicate the number of open fault messages 61 with a medium priority 32 and the switches 80 in the right-hand column indicate the number of open fault messages 61 with a low priority 33.

The switches 80 can each be actuated by pressing on the top part or the digital display 60, whereupon a microprocessor identifies the priority associated with the respective switch 80 and the installation part associated with the respective switch 80 and initiates user guidance in order to control the selected installation part for the purpose of processing the selected fault messages on a further display not shown in any more detail in FIG. 1.

The switches 80 may also have a rigid design or may be integrally formed with the base 81 if the digital display 60 is itself in the form of a touch-sensitive touchscreen and can detect touch, as a result of which the respective switch 80 is triggered.

FIG. 2 shows a user interface 100 which is in the form of a touchscreen and is integrated in a tablet, for example. The left-hand half of the virtual graphical interface of the user interface 100 displays a matrix 30. In the matrix 30, different display areas each show a number of open fault messages 61 and a number of acknowledged fault messages 62 for a first installation part 41, a second installation part 42, a third installation part 43 and a fourth installation part 44 and for a high priority 31, a medium priority 32 and a low priority 33. The installation parts and priorities are in turn indicated in a table header 50, a sum of the number of open fault messages 61 and the number of acknowledged fault messages 62 over all installation parts being displayed in the topmost row of the matrix 30 in the table header 50.

For example, the display field in the second column and the second row of the matrix 30 indicates that two fault messages are open for the first installation part 41 and two fault messages have been processed. The latter are still indicated since, although they have been processed, the first installation part 41 has not yet concluded the fault elimination measures. This is the case, for example, when a pump has not yet been started.

The display areas or fields of the matrix are sufficiently large to be able to be accurately selected on a touchscreen by means of touch. User guidance is then started, which makes it possible to control the selected installation part for the purpose of processing the selected fault messages. For this purpose, instead of the matrix 30 or additionally on a further display, a menu or other virtual operating elements and additional information are displayed, for example, and can be used to control the selected installation part for the purpose of eliminating the fault.

The right-hand half of the virtual graphical interface of the user interface 100 displays, beside the matrix 30, a logical view 40 of an industrial installation, the fault messages for which are displayed both in the matrix 30 and in the logical view 40. There is therefore a correlation between the two displays by virtue of the display of the fault messages being kept in sync on both sides. For this purpose, the first installation part 41, the second installation part 42, the third installation part 43 and the fourth installation part 44 are represented by boxes in the logical view, in which case the associated fault messages are displayed in each installation part or box with the aid of differently colored block symbols for fault messages with a high priority 71, block symbols for fault messages with a medium priority 72 and block symbols for fault messages with a low priority 73.

Instead of the block diagram from FIG. 2, the logical view 40 may also display a tree diagram of the industrial installation, for example.

The user interfaces shown in FIGS. 1 and 2 are suitable for use in a control room of a power plant, for example. The virtual user interface shown in FIG. 2 enables mobile use for maintaining and diagnosing wind power plants, for example, when displayed on a tablet.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A user interface comprising:
a data interface set up to receive fault messages which have each been assigned a priority from a plurality of priorities and an installation part from a plurality of installation parts of an industrial installation, wherein touch-sensitive display areas are arranged in a two-dimensional matrix, the plurality of priorities having been sorted in a first dimension of the matrix such that each column in the first dimension refers to its own priority, and the plurality of installation parts having been sorted in a second dimension of the matrix such that each row in the second dimension refers to its own installation part, each touch-sensitive display area displaying a number of open fault messages and a number of acknowledged fault messages in the first dimension, in a same column, for each priority of the plurality of priorities;

a second display region which is arranged beside the touch-sensitive display areas and is set up to output a logical view of the industrial installation, and a computing unit which is programmed to:
- display the fault messages in the corresponding touch-sensitive display areas according to the priority and the installation part associated with the fault message,
- subdivide the logical view into the plurality of installation parts,
- display the fault messages in or beside the respective plurality of installation parts in the logical view, and
- detect when one of the touch-sensitive display areas is touched, to select the respective priority, the respective installation part and the associated fault messages and to initiate user guidance in order to control the selected installation part for the purpose of processing the selected fault messages;

wherein the fault messages are displayed and kept in sync on both the two-dimensional matrix and in the logical view to correlate the two-dimensional matrix and the second display region.

2. The user interface as claimed in claim 1, wherein each touch-sensitive display area consists of a digital display or a touchscreen, and a touch-sensitive contact or switch is actuated by touching or pressing on the display area.

3. The user interface as claimed in claim 1, wherein all touch-sensitive display areas are arranged on a single touchscreen.

4. The user interface as claimed in claim 1, wherein the user interface is part of a control room and the industrial installation is a power plant, or wherein the user interface is a touch-sensitive tablet and the industrial installation is a wind power plant.

5. A method for eliminating faults in an industrial installation comprising:
- receiving, by a data interface, fault messages which are or have each been assigned a priority from a plurality of priorities and an installation part from a plurality of installation parts of an industrial installation, and
- arranging touch-sensitive display areas in a two-dimensional matrix, the plurality of priorities being sorted in a first dimension of the matrix such that each column in the first dimension refers to its own priority, and the plurality of installation parts being sorted in a second dimension of the matrix such that each row in the second dimension refers to its own installation part, each touch-sensitive display area displaying a number of open fault messages and a number of acknowledged fault messages in the first dimension, in a same column, for each priority of the plurality of priorities, wherein a second display region beside the touch-sensitive display areas displays a logical view of the industrial installation, wherein a computing unit:
- displays fault messages in the corresponding touch-sensitive display areas according to their priority and installation part,
- subdivides the logical view into the plurality of installation parts, and
- displays the fault messages in or beside the respective installation parts in the logical view, wherein the computing unit detects when one of the touch-sensitive display areas is touched and then selects the respective priority, the respective installation part and the associated fault messages and initiates user guidance in order to control the selected installation part for the purpose of processing the selected fault messages;

wherein the fault messages are displayed and kept in sync on both the two-dimensional matrix and in the logical view to correlate the two-dimensional matrix and the second display region.

6. The method as claimed in claim 5, wherein the computing unit displays both a number of open fault messages and a number of acknowledged fault messages in the display areas.

7. The method as claimed in claim 5, wherein the computing unit displays, at the edge of the matrix, a table header which indicates a legend for the plurality of priorities and the plurality of installation parts and indicates a sum of a number of open fault messages over all installation parts for each priority.

8. A non-transitory computer-readable data storage medium, which stores a computer program which carries out the method as claimed in claim 5 when it is executed in a computer.

9. A computer program product, comprising a computer readable hardware storage device storing a computer readable program code, the computer readable program code comprising an algorithm that when executed by a computer processor of a computing system implements the method as claimed in claim 5.

10. The user interface as claimed in claim 1, wherein the logical view is a block or tree diagram.

11. The user interface as claimed in claim 3, wherein the single touchscreen is a touch-sensitive tablet.

12. The method as claimed in claim 5, wherein the logical view is a block or tree diagram.

* * * * *